United States Patent
Gangam et al.

(10) Patent No.: US 12,388,770 B1
(45) Date of Patent: Aug. 12, 2025

(54) NETWORK SWITCHING FABRIC EFFICIENCY

(71) Applicant: Auradine, Inc., Santa Clara, CA (US)

(72) Inventors: Srinivas Gangam, Santa Clara, CA (US); Ashwin Alapati, Santa Clara, CA (US); Amit Srivastava, Santa Clara, CA (US)

(73) Assignee: Auradine, Inc., Santa Clara, CA (US)

( * ) Notice: Subject to any disclaimer, the term of this patent is extended or adjusted under 35 U.S.C. 154(b) by 0 days.

(21) Appl. No.: 19/187,385

(22) Filed: Apr. 23, 2025

(51) Int. Cl.
H04L 49/101 (2022.01)

(52) U.S. Cl.
CPC ............... H04L 49/101 (2013.01)

(58) Field of Classification Search
None
See application file for complete search history.

(56) References Cited

U.S. PATENT DOCUMENTS

| | | | |
|---|---|---|---|
| 10,210,092 B1* | 2/2019 | Miao | G06F 12/02 |
| 10,742,555 B1* | 8/2020 | Shalev | H04L 47/283 |
| 2020/0050569 A1* | 2/2020 | Mora Porta | G06F 13/4022 |
| 2022/0201782 A1* | 6/2022 | Mann | H04W 76/15 |
| 2023/0292243 A1* | 9/2023 | Mueck | H04W 52/0216 |

* cited by examiner

*Primary Examiner* — Diane L Lo
(74) *Attorney, Agent, or Firm* — Fish & Richardson P.C.

(57) ABSTRACT

The present disclosure generally relates to improving the efficiency of a network switching fabric. Some aspects of the present disclosure relate to an apparatus that includes: multiple ports configured to interface with multiple hardware accelerators; multiple multiplexers configured to communicate with the ports via multiple input channels; multiple demultiplexers configured to communicate with the ports via multiple output channels; a first router coupled to the multiplexers and the demultiplexers via a set of header channels, the first router configured to route header portions of one or more messages; and a second router coupled to the multiplexers and the demultiplexers via a set of data channels, the second router configured to route data portions of the one or more messages.

30 Claims, 6 Drawing Sheets

NETWORK SWITCHING FABRIC EFFICIENCY

TECHNICAL FIELD

The present disclosure relates generally to electronic communications, and more specifically to improving the efficiency of a network switching fabric with a crossbar architecture.

BACKGROUND

A hardware accelerator is a specialized processor or circuit that is configured to perform specific tasks faster and more efficiently than a general-purpose central processing unit (CPU). Hardware accelerators can be used to offload heavy computations from the CPU by executing specific types of tasks (such as graphics rendering, machine learning, cryptography, or signal processing) with optimized hardware. Some computing systems use network switching components to facilitate communications between hardware accelerators such as graphics processing units (GPUs).

SUMMARY

One aspect of the present disclosure relates to an apparatus including: a set of ports configured to interface with a set of hardware accelerators; a set of multiplexers configured to communicate with the set of ports via a set of input channels; a set of demultiplexers configured to communicate with the set of ports via a set of output channels; a first router coupled to the set of multiplexers and the set of demultiplexers via a set of header channels, the first router configured to route header portions of one or more messages; and a second router coupled to the set of multiplexers and the set of demultiplexers via a set of data channels, the second router configured to route data portions of the one or more messages.

In some implementations, the set of multiplexers is configured to merge the set of input channels into the set of header channels to communicate the header portions and the set of data channels to communicate the data portions.

In some implementations, the set of demultiplexers is configured to split the set of header channels and the set of data channels into the set of output channels.

In some implementations, the first router is configured to receive the header portions from each of the set of multiplexers via the set of header channels.

In some implementations, the first router is configured to transmit the header portions to each of the set of demultiplexers via the set of header channels.

In some implementations, the second router is configured to receive the data portions from each of the set of multiplexers via the set of data channels.

In some implementations, the second router is configured to transmit the data portions to each of the set of demultiplexers via the set of data channels.

In some implementations, the set of input channels include one or more of a request channel, a data channel, a read response channel, or a write response channel.

In some implementations, the set of output channels include one or more of a request channel, a data channel, a read response channel, or a write response channel.

In some implementations, at least one port of the set of ports includes an originator component and a completer component.

In some implementations, the originator component of the at least one port is configured to transmit information to a respective multiplexer of the set of multiplexers via a data channel and a request channel.

In some implementations, the originator component of the at least one port is configured to receive information from a respective demultiplexer of the set of demultiplexers via a read response channel and a write response channel.

In some implementations, the completer component of the at least one port is configured to transmit information to a respective multiplexer of the set of multiplexers via a read response channel and a write response channel.

In some implementations, the completer component of the at least one port is configured to receive information from a respective demultiplexer of the set of demultiplexers via a request channel and a data channel.

In some implementations, the apparatus includes a network switching fabric including a crossbar architecture.

In some implementations, each port of the network switching fabric is connected to every other port of the network switching fabric via a respective logical path, the logical path including at least one of the first router or the second router.

In some implementations, at least one multiplexer of the set of multiplexers includes (i) a set of buffers that store bits received from the set of input channels and (ii) a scheduler that maps bits from the set of buffers to the set of data channels and the set of header channels.

In some implementations, the scheduler maps header bits to the set of header channels and data bits to the set of data channels.

In some implementations, each demultiplexer of the set of demultiplexers includes (i) a set of buffers that store bits received from the set of data channels and the set of header channels and (ii) a respective set of schedulers that map bits from the set of buffers to the set of output channels.

Another aspect of the present disclosure relates to a method including: receiving a message from a first hardware accelerator via a first port of a set of ports; determining a header portion and a data portion of the message; transmitting the header portion of the message from the first port to a second port of the set of ports via a first router; transmitting the data portion of the message from the first port to the second port via a second router; and outputting the message to a second hardware accelerator via the second port.

In some implementations, the method further includes receiving a second message via the first router while the second router is transmitting the data portion of the message to the second port.

In some implementations, the second message includes a read request or a write response.

In some implementations, the second message is received from the second port or a third port of the set of ports.

In some implementations, the method further includes transmitting the message from the first port to a multiplexer via a set of input channels, where the multiplexer is configured to split the message into the header portion and the data portion.

In some implementations, the first router is configured to receive the header portion of the message from the multiplexer via a header channel.

In some implementations, the second router is configured to receive the data portion of the message from the multiplexer via a data channel.

In some implementations, the method further includes transmitting the message from a demultiplexer to the second port via a set of output channels, where the demultiplexer is configured to map the header portion and the data portion of the message to the set of output channels.

In some implementations, the first router is configured to transmit the header portion of the message to the demultiplexer via a header channel.

In some implementations, the second router is configured to transmit the data portion of the message to the demultiplexer via a data channel.

In some implementations, the first hardware accelerator includes a first graphics processing unit (GPU) and the second hardware accelerator includes a second GPU.

The details of one or more embodiments of these systems and methods are set forth in the accompanying drawings and the description below. Other features, objects, and advantages of these systems and methods will be apparent from the description and drawings, and from the claims.

DETAILED DESCRIPTION

A hardware accelerator is a specialized processor or circuit that is configured to perform specific tasks faster and more efficiently than a general-purpose central processing unit (CPU). Hardware accelerators can be used to offload heavy computations from the CPU by executing specific types of tasks (such as graphics rendering, machine learning, cryptography, or signal processing) with optimized hardware. Examples of hardware accelerators include graphics processing units (GPUs). Some computing systems are configured with a network switching fabric that enables low-latency data transfer between hardware accelerators. For complex tasks that involve more than one hardware accelerator (such as Large Language Model "LLM" processing used in artificial intelligence "AI" operations, among other high-performance computing tasks), a network switching fabric can provide a structured communication pathway between hardware accelerator ports, efficiently routing data packets from one hardware accelerator to another.

The performance of a network switching fabric can be determined based on the number of read or write operations per second. Each read/write operation involves two transactions: a request and a response. A traditional network switching fabric with a crossbar architecture (e.g., where every input port is connected to every output port) uses three separate routers (e.g., switching hardware components) for read/write operations: one for read/write requests, one for read responses, and one for write responses. Each port of the network switching fabric has a maximum bandwidth and each data channel (e.g., path between an incoming or receive port and an outgoing or transmit port of the network switching fabric) has to support this maximum bandwidth, which can lead to inefficient usage of resources. As described herein, bandwidth refers to the maximum rate at which data can be transferred through a channel in a given amount of time.

In accordance with aspects of the present disclosure, a network switching fabric with a crossbar architecture may be configured to handle read/write operations with two routers: a header router and a data router. Instead of maintaining separate routers for requests, write responses, and read responses (as in traditional network switch fabrics noted above), the network switching fabric of the present disclosure can logically separate header information from data/payload bits. This approach allows the network switching fabric to meet bandwidth and transactions-per-second (TPS) requirements more efficiently. To separate the header and data bits, each transaction (e.g., read request, write request, read response, write response) is logically partitioned into a header portion (including control or address information) and an optional data portion. A read request has a header portion but no data portion; a write request has a header portion and a data portion; a read response has a header portion and a data portion; and a write response has a header portion but no data portion.

The data router is configured to handle all data bits (both read response data and write request data). The data router may be configured to match the peak data bandwidth of the network switching fabric (e.g., 800 Gb/s). The data router can route all data flow control units or flits (e.g., data payloads), regardless of whether they are part of a read response or a write request. As such, there is no need for separate read-data and write-data crossbars. The header router is configured to handle all control flits (e.g., headers). The header router may be configured to meet all TPS constraints of the network switching fabric. Because many control operations (like write responses or read requests) do not have an associated payload/data portion, the header router can be more compact and efficient than a full-bandwidth router.

The network switching fabric architecture described herein supports concurrent utilization of the header router during ongoing data flits. For example, while the data router is transmitting multiple data flits for a large payload (e.g., 256 bytes, which can span several clock cycles), the header router can process additional header-only transactions for other read/write operations. In other words, if the subsequent "data beats" of a transaction with a large payload do not have header information, the header router can be reused for other transactions (e.g., a write response or another read request). This approach effectively interleaves multiple transactions, improving throughput and avoiding additional clock cycles that are consumed when one router handles both data flits and header flits sequentially.

The described architecture can also provide a reduction in wiring and hardware complexity. For example, by combining multiple data channels (request, data, read response, write response) into a data channel and a header channel, redundant high-bandwidth crossbars can be simplified. As a result, the number of wires on each port of the network switching fabric can be reduced by a factor of two. This reduces the total wire (and router) count, while ensuring non-blocking behavior for different traffic types (requests, responses).

The described network switching fabric architecture is configured so that request traffic does not block response traffic (and vice versa). Because the header router and the data router are separated (logically and/or physically), a backlog in one does not necessarily stall the other. This helps to maintain concurrency between data flow and control flow. The network switching fabric architecture described herein offers greater resource utilization, reduced hardware complexity, non-blocking concurrency, and improved scalability, among other benefits.

Figure 1:
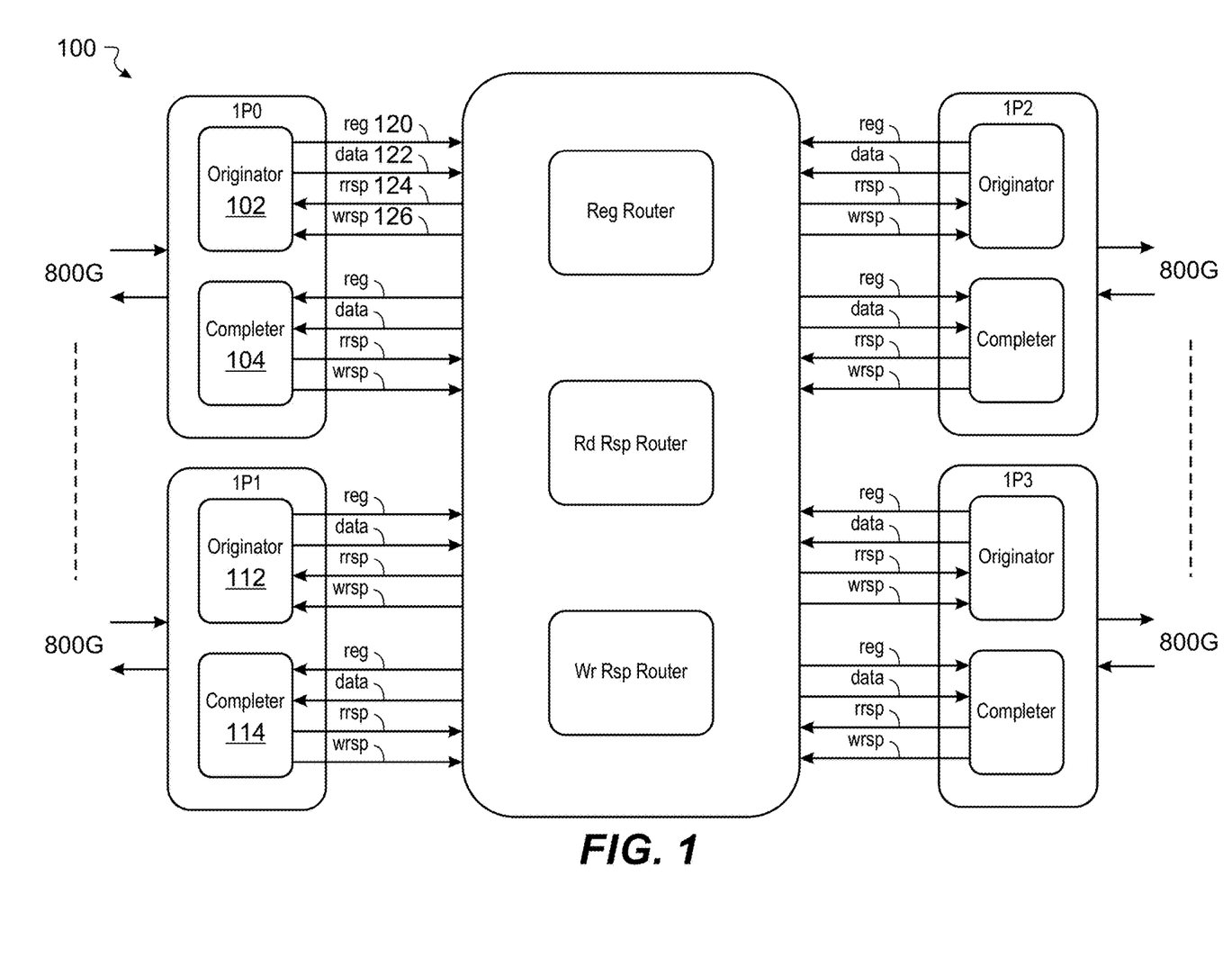
FIG. 1 illustrates an example network switching fabric.

FIG. 1 illustrates an example network switching fabric 100. The network switching fabric 100 is an example of a conventional network switching fabric (such as a network switching fabric that supports Advanced Extensible Interface "AXI"). As shown, the network switching fabric 100 includes four ports (labeled 1P0, 1P1, 1P2, and 1P3), each of which connects to a hardware accelerator or similar device. The network switching fabric 100 also includes three separate routers: a request router (Req Router) that handles read/write requests, a read response router (Rd Rsp Router) that handles read responses, and a write response header (Wr Rsp Router) that handles write responses.

As depicted in FIG. 1, each port (1P0-1P3) includes an originator and a completer. For example, port 1P0 includes originator 102 and completer 104, while port 1P1 includes originator 112 and completer 114. An originator is a logical component that initiates transactions (e.g., read or write requests). A completer is a logical component that responds to transactions from other ports (e.g., sending data for a read response or acknowledging a write request). The network switching fabric 100 includes various channels that carry different types of traffic (requests, data, read responses, and write responses) between each port and each of the three routers. Each channel may be configured to support the maximum bandwidth of its respective port.

As described herein, a "port" refers to a logical or physical interface by which a hardware accelerator (or any endpoint) connects to the switching fabric 100. In FIG. 1, these ports are denoted by 1P0, 1P1, 1P2, or 1P3. A port is responsible for interfacing the accelerator's data streams (such as read/write commands and responses) with the switching fabric's internal routers. Each port includes circuitry (e.g., multiplexers, buffers) that prepare data or headers for transmission.

As noted above, each port includes an originator, which is a component that initiates requests. For example, the originator can send read commands to retrieve data from another accelerator's memory or write commands to store data. The originator includes control logic (e.g., hardware and/or code) to generate requests with the appropriate address/command information. By contrast, the completer is a component that responds to incoming requests from other ports. For instance, if 1P0 sends a read request to 1P1 through its originator 102, completer 114 of 1P1 processes the request and sends back a read response. The completer typically includes logic to read or write the requested data from local memory (or from local accelerator resources) and to generate a valid response (e.g., read response data or a write acknowledgment).

The network switching fabric 100 includes three different routers: Req Router, Rd Rsp Router, and Wr Rsp Router. Each router is effectively a crossbar or switch dedicated to a particular type of traffic. Req Router is configured to route read/write request messages from the originator of a source port to the completer of a target port. Rd Rsp Router is configured to route read responses back from the completer to the originator that requested the data. Wr Rsp Router is configured to route write responses (acknowledgments or completion messages) from the completer to the originator. By separating these different traffic types into three routers, the network switching fabric 100 ensures "non-blocking" behavior, e.g., requests do not stall read responses or write responses (and vice versa).

The aforenoted routers may communicate with each port over different channels. As described herein, a channel is a logical or physical pathway along which a specific type of data (e.g., request, read response, write response) is routed. In some network protocols (like AXI), there are multiple channels, such as: a request channel 120, a data channel 122, a read response channel 124, and a write response channel 126. In FIG. 1, each arrow connecting a port (1P0-1P3) to a router represents a dedicated channel for a particular traffic type. Each channel is typically capable of handling the full bandwidth of the port (e.g., 800 Gb/s). In some implementations, the network switching fabric 100 supports full-duplex communication, such that 1P0 can transmit information to 1P1 and receive information from 1P1 in the same clock cycle.

When an originator (e.g., originator 102 at 1P0) needs to read or write data at another port (e.g., 1P1), the originator sends a request message on the req channel 120, and Req Router directs the message to the appropriate completer 114 at 1P1. For read responses, completer 114 retrieves the requested data and sends it back to 1P0 (via Rd Rsp Router). The read response arrives at originator 102 (which initiated the request) via the rrsp channel 124. For write responses, completer 114 at 1P1 updates its local memory and sends a write response back to the originator 102 at 1P0 (via the Wr Rsp Router). This write response typically does not have a payload (just a header/acknowledgment), but it still travels over a dedicated high-bandwidth path (wrsp channel 126).

In the configuration shown, each router (Req, Rd Rsp, Wr Rsp) and each channel (e.g., req channel 120, data channel 122, rrsp channel 124, wrsp channel 126) is configured to accommodate the full bandwidth (e.g., 800 Gb/s) because the traffic type for any given port could theoretically reach the maximum throughput. This results in the network switching fabric 100 having three separate full-bandwidth crossbars. While this approach is non-blocking, it can increase the overall complexity and cost of the network switching fabric 100.

Figure 2:
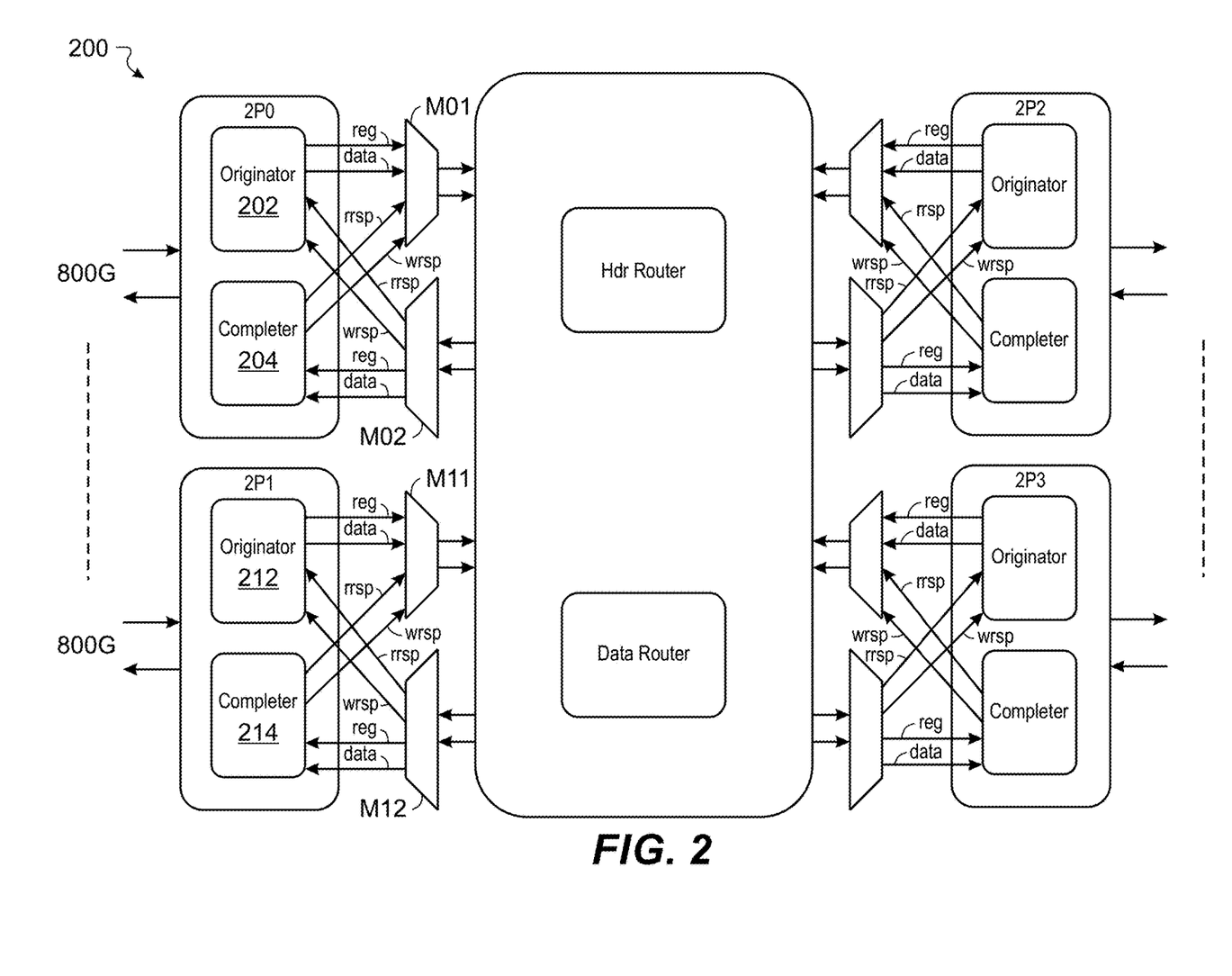
FIG. 2 illustrates an example network switching fabric, according to some implementations.

FIG. 2 illustrates an example network switching fabric 200, according to some implementations. Unlike the traditional network switching fabric 100 of FIG. 1, which uses three routers (Req, Rd Rsp, Wr Rsp) to handle read/write operations, the network switching fabric 200 includes two routers: a header router (Hdr Router) and a data router (Data Router). The network switching fabric 200 of FIG. 2 employs one router—Hdr Router—for header flits (including, e.g., commands or acknowledgments) and one router—Data Router—for data flits (e.g., data payloads). This approach eliminates the need for multiple full-bandwidth crossbars dedicated to specific traffic types.

As shown in FIG. 2, the network switching fabric 200 includes multiple ports (denoted as 2P0, 2P1, 2P2, and 2P3). Each port includes an originator (which initiates requests) and a completer (which responds to incoming requests). For example, port 2P0 includes originator 202 and completer 204, while port 2P1 includes originator 212 and completer 214. In the example shown, each port interfaces with the header router and the data router via multiplexers that merge or separate different traffic types. For example, port 2P0 uses multiplexer M01 to sends requests, responses or data to the header router and/or the data router, and uses multiplexer M11 to receive requests, responses or data from the header router and/or the data router. On the transmit side (where information flows from port to router), multiplexers (e.g., multiplexers M01 and M11 for ports 2P0 and 2P1 respectively) are configured to logically merge the request channel (req), the data channel (data), the read response channel (rrsp), and the write response channel (wrsp) into a header/control channel and a data/payload channel before transmission to the header router. On the receive side (where information flows from router to port), demultiplexers (e.g., multiplexers M02 and M12 for ports 2P0 and 2P1 respectively) are configured to split the header channel and the data channel into a request channel, a data channel, a read response channel, and a write response channel. At each port, the multiplexers are configured to separate the header portion of a transaction (e.g., address, command, or response information) from the data portion (if any) so they can be routed by the header router and the data router, respectively.

The header router is configured to handle transactions with header information-such as write responses, read requests, and other commands that do not include a data payload. When a transaction includes a data payload (e.g., a write request or a read response), the header router processes the initial header flit, and the data router processes the corresponding data flits. Because the header router and the data router operate in parallel, subsequent data cycles (or "beats") for a large payload may continue to flow through the data router while the header router is free to process other header-only transactions. This interleaving capability improves overall throughput and prevents the header router from stalling when the data router is occupied by an ongoing multi-cycle data transfer.

In comparison to the network switching fabric 100 of FIG. 1, the network switching fabric 200 may have fewer wires (e.g., channels, paths) and reduced hardware complexity. In some implementations, the data router is capable of supporting full bandwidth (e.g., 800 Gb/s) and the header router is configured to meet TPS requirements. The network switching fabric 100 includes more high-bandwidth channels and three separate routers, each of which is provisioned for peak throughput. By contrast, the network switching fabric 200 has fewer high-bandwidth channels, a header router that processes all control/header flits, and a data router that handles all data flits. Multiplexing logical channels (req, data, rrsp, wrsp) into one header channel and one data channel on the port side can thus reduce the number of wires and high-bandwidth crossbars needed to handle read/write operations.

In this manner, the header router can efficiently use clock cycles for command-only operations whenever the data router is handling multi-beat data transfers. This architecture not only reduces hardware complexity (e.g., by consolidating multiple channels into two flows), but also allows for non-blocking concurrency between the header router and the data router. As a result, the network switching fabric 200 can provide greater scalability and performance in high-bandwidth, high-transaction-rate environments.

Figure 3:
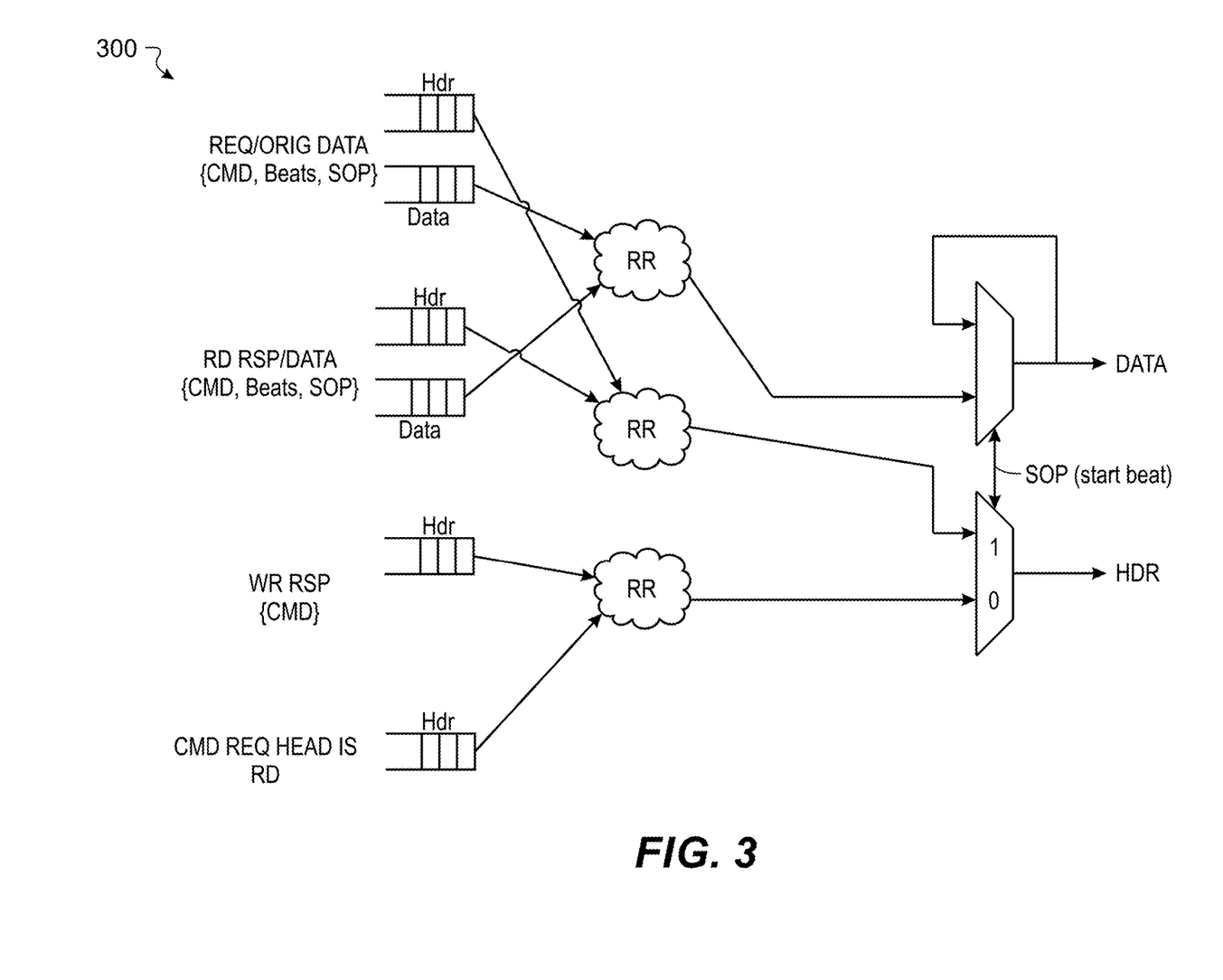
FIG. 3 illustrates an example of a logical scheduler, according to some implementations.

FIG. 3 illustrates an example of a logical scheduler 300, according to some implementations. The logical scheduler 300 is responsible for selecting which bits are passed to the header router and the data router of the network switching fabric 200 in each clock cycle. In some implementations, each of the ports 2P0-2P3 includes a logical scheduler 300. In this example, multiple streams of incoming transactions are provided to a series of round-robin components (RR) and then merged into two output paths: one going to the header router (HDR) and one going to the data router (DATA). The REQ/ORIG DATA stream corresponds to a request or original data path, the RD RSP/DATA stream corresponds to a read response path, the WR RSP stream corresponds to a write response path, and the CMD REQ HEAD IS RD stream indicates whether a particular command is associated with a read operation.

The REQ/ORIG DATA stream and the RD RSP/DATA stream each include a command (CMD) portion, a sequence of data beats, and a start of packet (SOP) indicator. As shown in FIG. 3, these two streams are separated into a header segment and a data segment. One of the round-robin components may be configured to select bits from the data segment of the REQ/ORIG DATA stream or the RD RSP/DATA stream in each clock cycle. Another round-robin component may be configured to select bits from the header segment of the REQ/ORIG DATA stream or the RD RSP/DATA stream in each clock cycle. The WR RSP stream and the CMD REQ HEAD IS RD stream only include a command portion (no data payload). Accordingly, both of these streams have a header segment but no data segment. One of the round-robin components may be configured to select bits from the header segment of the WR RSP stream or the CMD REQ HEAD IS RD stream in each clock cycle.

Within the logical scheduler 300, each round-robin component selects bits from the incoming streams to determine which transaction proceeds in the current clock cycle. For transactions that include a payload (such as a read response or a write request), the scheduler 300 identifies the presence of data beats and directs those beats toward the data header. Concurrently, the command/header portion of the same transaction is directed toward the header router. The SOP indicator signals the beginning of a new transaction or packet, prompting the scheduler 300 to process the associated header flit and, if applicable, the first data flit in the same clock cycle. Once the header flit is scheduled, subsequent data beats continue to flow on the data path, freeing the header path for other header-only transactions, such as a write response or an additional read request.

Because the round-robin arbiters operate on multiple streams simultaneously, the logical scheduler 300 can interleave commands and data from different transactions, allowing the header path to remain active even while the data path is transmitting multi-beat payloads. In effect, the scheduler hardware uses round-robin components to maintain concurrency between the header router and the data router. The CMD REQ HEAD IS RD signal helps the scheduler 300 differentiate between read-related commands and write-related commands, ensuring that each is assigned to the appropriate router. As a result, the logical scheduler 300 efficiently dictates when and how each flit (header or data) is delivered to the header router or the data router, which improves overall throughput and prevents stalls that might occur if header and data traffic were forced to share a single path sequentially.

Figure 4:
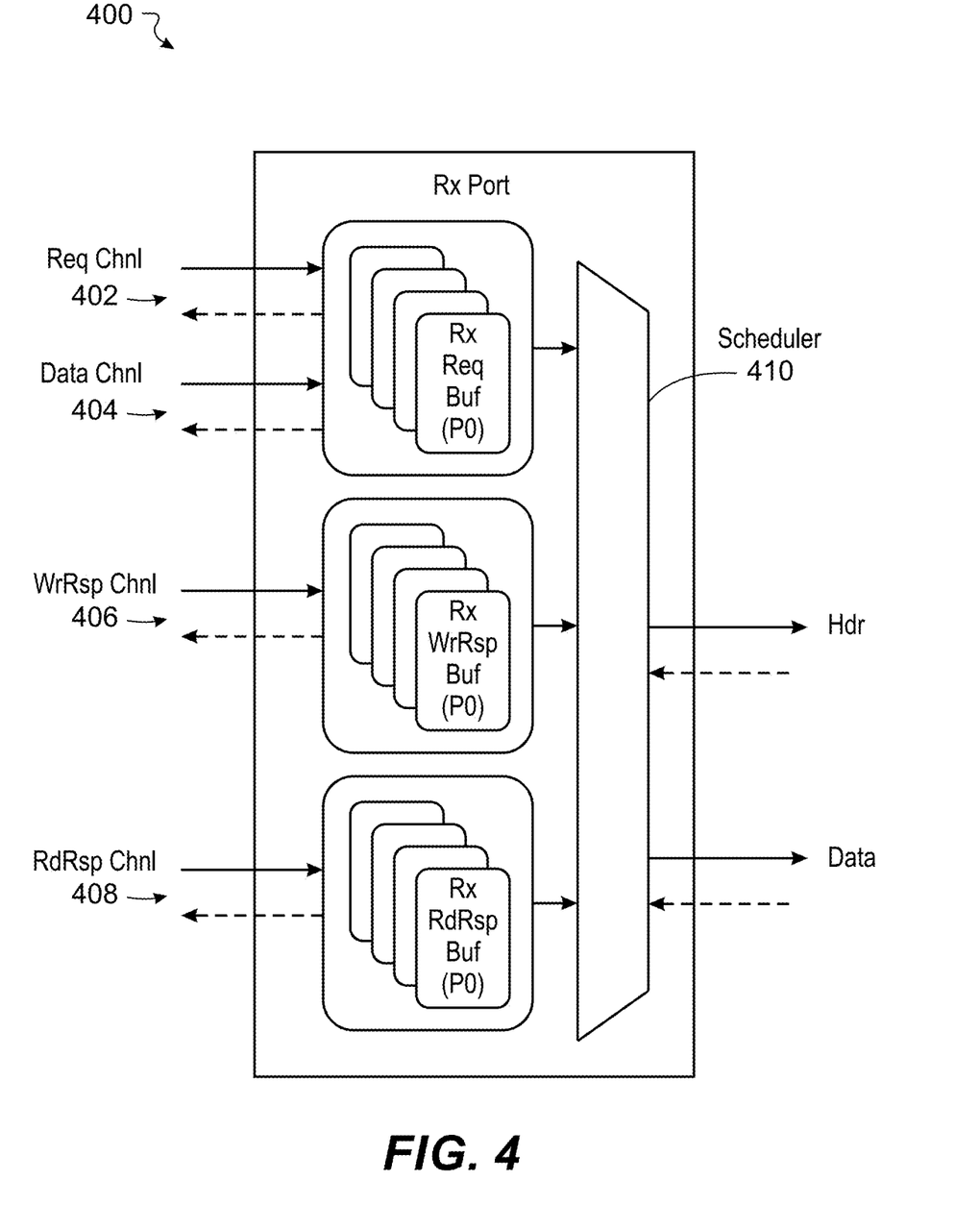
FIG. 4 illustrates an example receive port of a network switching fabric, according to some implementations.

FIG. 4 illustrates an example receive port 400, according to some implementations. In this example, the receive port 400 is associated with port 2P0 of the network switching fabric 200, but a similar arrangement can be used for other ports of the network switching fabric 200. The receive port 400 is configured to accept incoming traffic from a corresponding port of a hardware accelerator on four logical channels: a request channel (Req Chnl 402), a data channel (Data Chnl 404), a write response channel (WrRsp Chnl 406), and a read response channel (RdRsp Chnl 408). Each channel is coupled to a dedicated receive buffer within the port 400. Specifically, a receive request buffer (Rx Req Buf) stores incoming request commands, a receive write response buffer (Rx WrRsp Buf) stores incoming write responses, and a receive read response buffer (Rx RdRsp Buf) stores incoming read responses. Although FIG. 4 depicts separate buffers for different traffic types, the described techniques can be implemented using various memory or queue structures capable of handling bandwidth and transaction rates associated with each channel.

The receive port 400 also includes a scheduler 410, as depicted in FIG. 4. The scheduler 410 is responsible for determining how buffered traffic is routed to the header router (Hdr) and the data router (Data). In some implementations, the scheduler 410 may be similar to the logical scheduler 300 of FIG. 3. When a request command arrives via the request channel, it is stored in the receive request buffer until the scheduler determines that it can be sent to the header router. If the same transaction includes data flits—such as a write request that carries a payload—those flits are directed to the data router. Similarly, when a read response arrives on the read response channel, the command portion of the response is extracted and passed to the header router, while the associated payload (if present) proceeds to the data router.

By queueing and directing commands to the scheduler 410, the receive port 400 helps support the dual-router functionality of the network switching fabric 200. For instance, write response commands arriving on the write response channel have no associated payload, so they can be processed by the header router while the data router is occupied. For read response traffic arriving on the read response channel, the header portion is routed to the header router, and the data portion is routed to the data router. The scheduler 410 manages this separation of traffic on a per-cycle basis, referencing control signals and other information to determine when a header flit or data flit is present in each buffer.

Using a combination of per-channel receive buffers and a centralized scheduler, the receive port 400 ensures that each incoming flit—whether a request, write response, read response, or standalone data segment—can be directed efficiently to the correct router. This architecture allows the network switching fabric 200 to maintain high throughput by interleaving header and data flits, as described in earlier figures.

Figure 5:
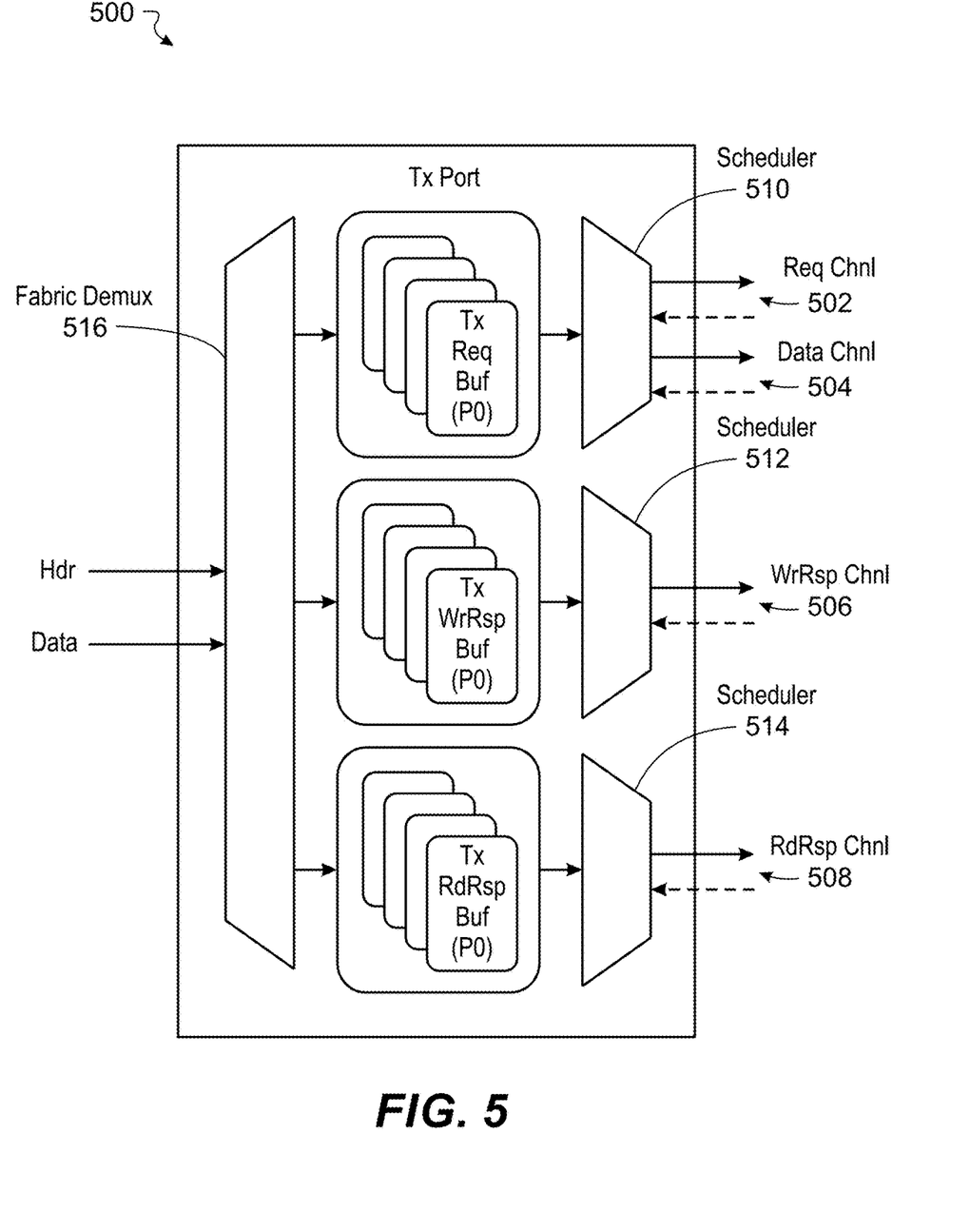
FIG. 5 illustrates an example transmit port of a network switching fabric, according to some implementations.

FIG. 5 illustrates an example transmit port 500, according to some implementations. In this embodiment, the transmit port 500 is associated with port 2P0 of the network switching fabric 200, but a similar arrangement can be used for other ports of the network switching fabric 200. As with the receive port 400 of FIG. 4, the transmit port 500 is configured to interface with a corresponding port of a hardware accelerator via four logical channels: a request channel (Req Chnl 502), a data channel (Data Chnl 504), a write response channel (WrRsp Chnl 506), and a read response channel (RdRsp Chnl 506). However, while the receive port 400 manages incoming transactions from the hardware accelerator, the transmit port 500 manages outgoing transactions back to the hardware accelerator.

Within the transmit port 500, incoming flits from the header router (Hdr) and data router (Data) are first separated by a fabric demultiplexer (fabric demux) 516. The demultiplexer 516 inspects each flit to determine whether it carries header information or data. In some implementations, the demultiplexer 516 combines the header information with the data and directs the resulting payload to the appropriate buffer. If, for example, a flit corresponds to a write response (which typically has no payload), it is routed toward the transmit write response buffer (Tx WrRsp Buf). If a flit corresponds to a read response, it is routed toward the transmit read response buffer (Tx RdRsp Buf). Similarly, flits corresponding to read and write requests are directed to the transmit request buffer (Tx Req Buf).

Each buffer may be coupled to a dedicated scheduler that maps flits onto the respective output channels. For example, as shown, Tx Req Buf, Tx WrRsp Buf and Tx RdRsp Buf are coupled to schedulers 510, 512 and 514, respectively. The schedulers 510, 512 and 514 may operate in a manner analogous to the logical scheduler 300 of FIG. 3, for example, by determining whether a given flit includes a header and/or data, determining if the flit can be merged with other outgoing traffic, and deciding which flits to transmit each clock cycle. Using a fabric demultiplexer, dedicated transmit buffers, and corresponding schedulers, the transmit port 500 efficiently forwards completed transactions from the header router and the data router back to the hardware accelerator.

Figure 6:
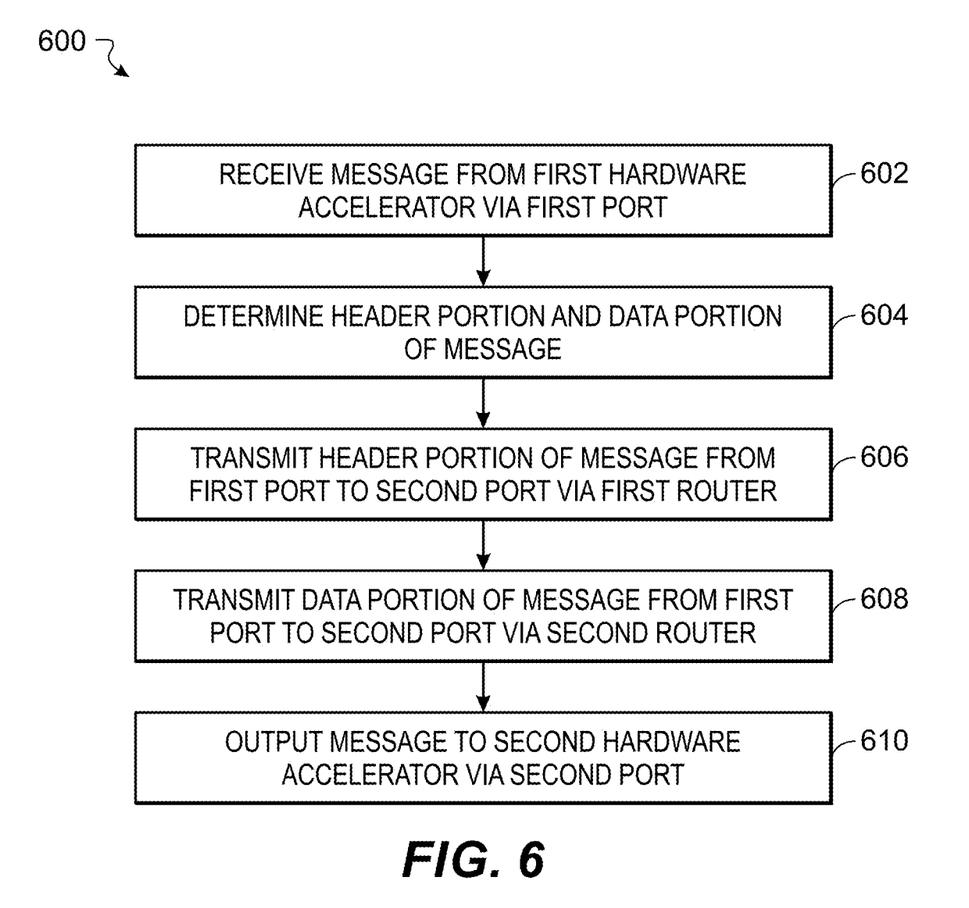
FIG. 6 illustrates a flowchart of an example method for routing data and header information between ports of a network switching fabric, according to some implementations.

FIG. 6 illustrates a flowchart of an example method 600 for routing data and header information between ports of a network switching fabric, according to some implementations. For clarity of presentation, the method 600 is described in the context of the preceding figures. For example, the method 600 can be performed by the network switching fabric 200 of FIG. 2. The method 600 can also be performed by any suitable system, environment, software, hardware, or combination thereof. In some implementations, operations of the method 600 can be run in parallel, in combination, in loops, or in any order. The example method 600 shown in FIG. 6 can be modified or reconfigured to include additional, fewer, or different steps (not shown in FIG. 6), which can be performed in the order shown or in a different order.

At 602, the network switching fabric 200 receives a message (e.g., a read response or a write request) from a first hardware accelerator (e.g., GPU) via a first port (e.g., 2P0).

At 604, the network switching fabric 200 determines a header portion and a data portion of the message (e.g., using scheduler 410 in port 2P0).

At 606, the network switching fabric 200 transmits the header portion of the message from the first port to a second port (e.g., 2P1) via a first router (e.g., header router). For example, scheduler 410 of port 2P0 forwards the header portion of the message to Hdr Router of the switching fabric 200.

At 608, the network switching fabric 200 transmits the data portion of the message from the first port to the second port via a second router (e.g., a data router). For example, if the message includes a data portion (such as a read response or a write request) scheduler 410 of port 2P0 forwards the data portion of the message to Data Router of the switching fabric 200.

At 610, the network switching fabric 200 outputs the message to a second hardware accelerator via the second port. For example, the transmit port 500 of the port 2P1 may transmit the message to a GPU after receiving the header portion and the data portion of the message via the first router and the second router, respectively.

We claim:
1. An apparatus comprising:
a plurality of ports configured to interface with a plurality of hardware accelerators;
a plurality of multiplexers configured to communicate with the plurality of ports via a plurality of input channels;
a plurality of demultiplexers configured to communicate with the plurality of ports via a plurality of output channels;

a first router coupled to the plurality of multiplexers and the plurality of demultiplexers via a set of header channels, the first router configured to route header portions of one or more messages; and a second router coupled to the plurality of multiplexers and the plurality of demultiplexers via a set of data channels, the second router configured to route data portions of the one or more messages.

2. The apparatus of claim 1, wherein the plurality of multiplexers are configured to merge the plurality of input channels into the set of header channels to communicate the header portions and the set of data channels to communicate the data portions.

3. The apparatus of claim 1, wherein the plurality of demultiplexers are configured to split the set of header channels and the set of data channels into the plurality of output channels.

4. The apparatus of claim 1, wherein the first router is configured to receive the header portions from each of the plurality of multiplexers via the set of header channels.

5. The apparatus of claim 1, wherein the first router is configured to transmit the header portions to each of the plurality of demultiplexers via the set of header channels.

6. The apparatus of claim 1, wherein the second router is configured to receive the data portions from each of the plurality of multiplexers via the set of data channels.

7. The apparatus of claim 1, wherein the second router is configured to transmit the data portions to each of the plurality of demultiplexers via the set of data channels.

8. The apparatus of claim 1, wherein the plurality of input channels comprise one or more of a request channel, a data channel, a read response channel, or a write response channel.

9. The apparatus of claim 1, wherein the plurality of output channels comprise one or more of a request channel, a data channel, a read response channel, or a write response channel.

10. The apparatus of claim 1, wherein at least one port of the plurality of ports comprises an originator component and a completer component.

11. The apparatus of claim 10, wherein the originator component of the at least one port is configured to transmit information to a respective multiplexer of the plurality of multiplexers via a data channel and a request channel.

12. The apparatus of claim 10, wherein the originator component of the at least one port is configured to receive information from a respective demultiplexer of the plurality of demultiplexers via a read response channel and a write response channel.

13. The apparatus of claim 10, wherein the completer component of the at least one port is configured to transmit information to a respective multiplexer of the plurality of multiplexers via a read response channel and a write response channel.

14. The apparatus of claim 10, wherein the completer component of the at least one port is configured to receive information from a respective demultiplexer of the plurality of demultiplexers via a request channel and a data channel.

15. The apparatus of claim 1, wherein the apparatus comprises a network switching fabric including a crossbar architecture.

16. The apparatus of claim 15, wherein each port of the network switching fabric is connected to every other port of the network switching fabric via a respective logical path, the logical path comprising at least one of the first router or the second router.

17. The apparatus of claim 1, wherein at least one multiplexer of the plurality of multiplexers comprises (i) a plurality of buffers that store bits received from the plurality of input channels and (ii) a scheduler that maps bits from the plurality of buffers to the set of data channels and the set of header channels.

18. The apparatus of claim 17, wherein the scheduler maps header bits to the set of header channels and data bits to the set of data channels.

19. The apparatus of claim 1, wherein each demultiplexer of the plurality of demultiplexers comprises (i) a plurality of buffers that store bits received from the set of data channels and the set of header channels and (ii) a respective plurality of schedulers that map bits from the plurality of buffers to the plurality of output channels.

20. A method comprising:
receiving a message from a first hardware accelerator via a first port of a plurality of ports;
determining a header portion and a data portion of the message;
transmitting the header portion of the message from the first port to a second port of the plurality of ports via a first router;
transmitting the data portion of the message from the first port to the second port via a second router; and
outputting the message to a second hardware accelerator via the second port.

21. The method of claim 20, further comprising receiving a second message via the first router while the second router is transmitting the data portion of the message to the second port.

22. The method of claim 21, wherein the second message comprises a read request or a write response.

23. The method of claim 21, wherein the second message is received from the second port or a third port of the plurality of ports.

24. The method of claim 20, further comprising transmitting the message from the first port to a multiplexer via a plurality of input channels, wherein the multiplexer is configured to split the message into the header portion and the data portion.

25. The method of claim 24, wherein the first router is configured to receive the header portion of the message from the multiplexer via a header channel.

26. The method of claim 24, wherein the second router is configured to receive the data portion of the message from the multiplexer via a data channel.

27. The method of claim 24, further comprising transmitting the message from a demultiplexer to the second port via a plurality of output channels, wherein the demultiplexer is configured to map the header portion and the data portion of the message to the plurality of output channels.

28. The method of claim 27, wherein the first router is configured to transmit the header portion of the message to the demultiplexer via a header channel.

29. The method of claim 27, wherein the second router is configured to transmit the data portion of the message to the demultiplexer via a data channel.

30. The method of claim 20, wherein the first hardware accelerator comprises a first graphics processing unit (GPU) and the second hardware accelerator comprises a second GPU.

* * * * *